US007626344B2

(12) United States Patent
Alexandrov

(10) Patent No.: US 7,626,344 B2
(45) Date of Patent: Dec. 1, 2009

(54) PROGRAMMED BALLAST WITH RESONANT INVERTER AND METHOD FOR DISCHARGE LAMPS

(75) Inventor: Felix I. Alexandrov, Bedford, MA (US)

(73) Assignee: Osram Sylvania Inc., Danvers, MA (US)

(*) Notice: Subject to any disclaimer, the term of this patent is extended or adjusted under 35 U.S.C. 154(b) by 368 days.

(21) Appl. No.: 11/833,595

(22) Filed: Aug. 3, 2007

(65) Prior Publication Data
US 2009/0033236 A1 Feb. 5, 2009

(51) Int. Cl.
H05B 37/02 (2006.01)
(52) U.S. Cl. ...................... 315/291; 315/307
(58) Field of Classification Search ............. 315/209 R, 315/225, 247, 291, 307, 360, 361
See application file for complete search history.

(56) References Cited

U.S. PATENT DOCUMENTS 5,854,538 A 12/1998 Krummel
6,140,771 A 10/2000 Luger et al.
6,191,563 B1* 2/2001 Bangerter .................. 323/211
6,366,031 B2 4/2002 Klien
6,693,393 B2* 2/2004 Konishi et al. .............. 315/224
6,956,336 B2* 10/2005 Ribarich .................... 315/247
6,972,531 B2 12/2005 Krummel
7,187,132 B2 3/2007 Bakre

* cited by examiner

Primary Examiner—Douglas W Owens
Assistant Examiner—Jimmy T Vu
(74) Attorney, Agent, or Firm—Frank R. Agovino; Shaun P. Montana

(57) ABSTRACT

A ballast having a rapid inverter frequency control circuit that is used for programmed operation during lamps starting, during normal operation of all lamps and during no lamp(s) operation. A method and circuit controls frequency shift via a combination of different feedback circuits. A control signal for the inverter controller is synthesized as a sum of phase shifted inverter output voltage feedback signal and lamp current sense signal indicating status of each lamp connected to the ballast output.

21 Claims, 13 Drawing Sheets

PROGRAMMED BALLAST WITH RESONANT INVERTER AND METHOD FOR DISCHARGE LAMPS

FIELD OF THE INVENTION

The present invention relates to electronic ballasts for powering gas discharge lamp(s) and, in particular, to programmed ballast series resonant inverters used for instant lamp starting.

BACKGROUND OF THE INVENTION

High frequency resonant inverters are typically used in electronic ballasts to power gas discharge lamps. One advantage of voltage fed resonant inverters with MOSFETs is high efficiency associated with Zero Voltage Switching (ZVS) and with low drain to source resistance of power MOSFETs when conducting. These inverters provide almost sinusoidal current to the gas discharge lamps that is very important for longer lamp life.

A typical resonant inverter comprises a half bridge switching circuit with power MOSFETs generating high frequency AC to power a resonant load with at least one gas discharge lamp. Ballast voltage fed resonant inverter utilizes a series LC resonant tank circuit with the load connected in parallel to a resonant capacitor. A control circuit provides MOSFET switching frequency above a resonant frequency for zero voltage turn on. When switching above resonance, the input of the resonant load is inductive. When switching below resonant, this input is capacitive and should be avoided because it is associated with hard switching.

In the previous Osram Sylvania U.S. Pat. Nos. 6,090,473, 7,030,570 and 7,045,966, several ballast inverter control circuits have been proposed that employ standard industrial controllers and self-oscillating half bridges, for instance, the IR215X series and the IR53H(D) series from International Rectifier, UBA2024P from Philips, L6579 series from ST Microelectronics, etc.

Accordingly to above, self oscillating drivers-controllers utilize phase locked feedbacks for guaranteed soft switching of inverter transistors. Another advantage of the feedbacks is a possibility for dimming by a small signal DC bias. Also, Osram Sylvania U.S. Pat. No. 6,545,432 discloses lamp-out sensor with a series to lamp capacitor to shut down the resonant inverter after occurrence of a lamp-out condition.

In the above mentioned Osram Sylvania patents, ballast inverter circuits are illustrated that power a single discharge lamp. However, there is a big demand for an instant start multi-lamp ballast inverter powering several lamps simultaneously. In some applications the ballast should meet lamp Hot Swap requirements and continue to operate without interruption when a lamp is removed. One of solutions to the problem is described in the publication "High-Efficiency Low-Stress Electronic Dimming Ballast for Multiple Fluorescent Lamps", Tsai-Wu et all, IEEE Transactions on Power Electronics, Vol. 14, NO. 1, 1999. This ballast utilizes multiple resonant loads connected in parallel in the resonant inverter.

Having multiple resonant inductors and capacitors may not be a cost effective solution. U.S. Pat. No. 6,362,575 issued to Chang et al. discloses a single resonant inductor and a single resonant capacitor ballast inverter for multiple discharge lamps. The voltage fed ballast inverter provides high frequency regulated voltage for discharge lamps each connected in series with a ballasting capacitor. This inverter has a single mode operation capability. Because output regulated voltage should be always high (at least, 600V AC for T8 lamp) to provide starting, the ballast has increased power losses in steady-state operation, basically in the resonant inductor.

Therefore, to reduce inverter output voltage with several parallel lamps, there is a need for a more efficient stepped control in programmed controller operations. A control circuit with wider frequency range for the inverter to operate the resonant load with low Q, especially for inverter operating from high voltage DC Bus (400V and higher), would be preferable in certain configurations.

SUMMARY OF THE INVENTION

It is an object of the present invention to provide a ballast programmable in starting and steady-state modes based on the number of lamps connected to the inverter.

It is the other object of the present invention to provide low cost control circuits for a multi-lamp ballast series resonance inverter utilizing ballast dimming capability.

It is the other object of the present invention to provide a low cost transformerless instant start multi-lamp ballast with self-oscillating control IC utilizing phase lock via AC voltage feedback.

It is other object of the present invention to provide a low cost transformerless multi-lamp ballast having very low lamp pin to ground leakage current to satisfy safety requirements.

It is the other object of the invention to provide stable and reliable series resonance inverter operation with variable lamp current.

It is the other object of invention to provide a ballast series resonant inverter which meets a hot relamping requirement.

It is the other object of the invention to provide a resonance inverter with regulated and/or limited output voltage.

It is another object of in invention to provide a series resonance inverter operating in an open output circuit with minimum power loss in the ballast.

It is the other object of the invention to provide a high efficiency ballast series resonance inverter operating several lamps from a high voltage DC bus (400-460V) after power factor correction.

In one embodiment, the present invention provides an efficient and cost effective system for controlling a resonant inverter through a cost effective IC such as common self-oscillating half bridge driver IC. Programmed ballast inverter operation is obtained by combination of two different feedback loops: a voltage feedback loop from the output of resonant tank for operation of the IC above a floating resonant frequency; and a positive current feedback loop from the lamps controlled by a DC bias signal proportional to number of lamps connected. Mixing the DC lamp current feedback signals with a phase shifted voltage feedback signal provides several practical ballast inverter circuits for powering gas discharge lamp(s).

Other objects and features will be in part apparent and in part pointed out hereinafter.

BRIEF DESCRIPTION OF THE DRAWINGS

The above and other features and advantages of the invention will be better understood through the following illustrations.

Corresponding reference characters indicate corresponding parts throughout the drawings.

DETAILED DESCRIPTION OF THE INVENTION

Figure 1:
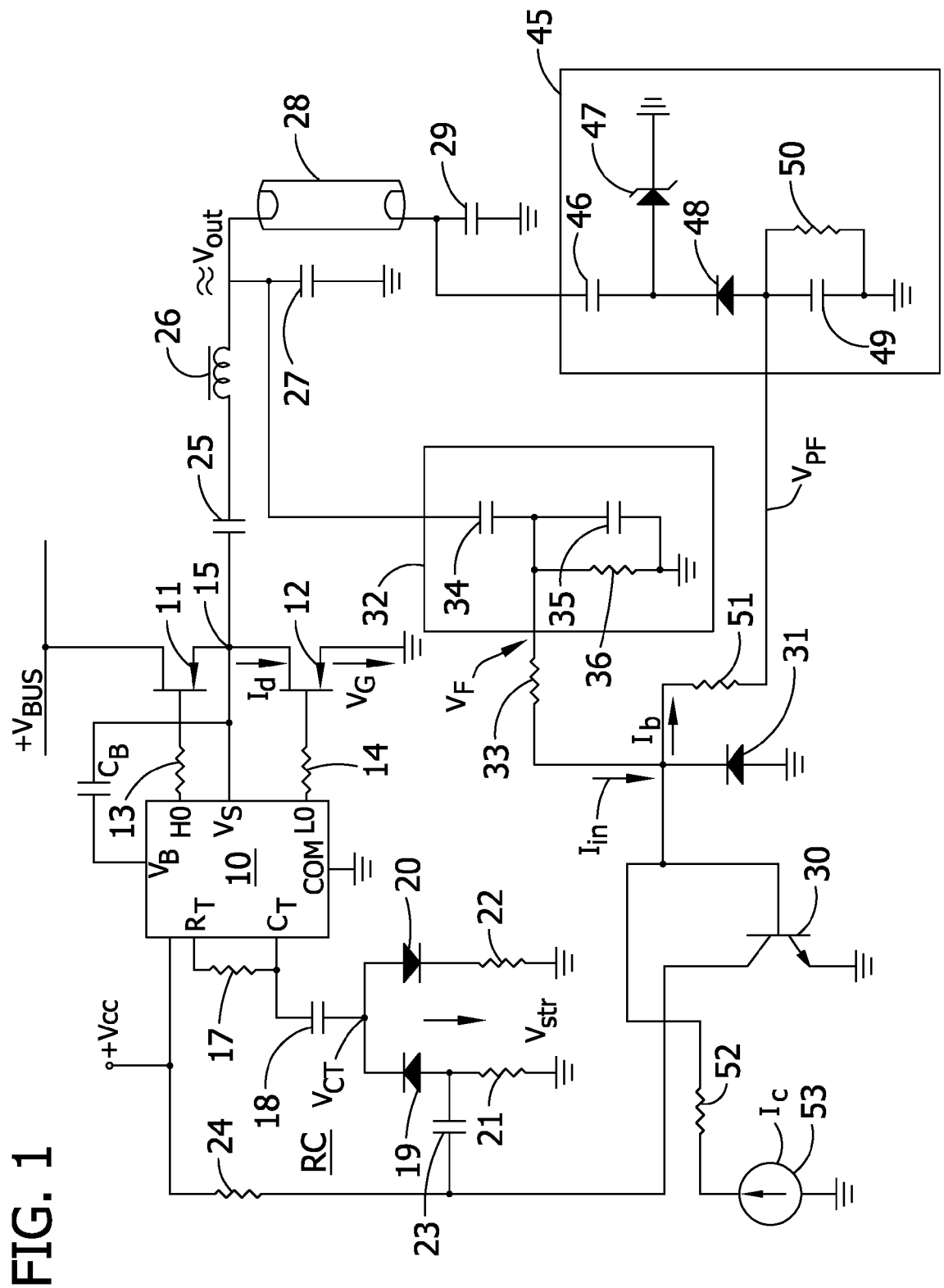
FIG. 1 is a circuit diagram of series resonant inverter with combined voltage and lamp current feedback circuit according to the present invention for powering a single instant start gas discharge lamp.

The present invention will be explained in more detail with reference to the attached drawings. FIG. 1 illustrates a ballast series resonance inverter circuit controlled by a standard self oscillating driver integrated circuit IC 10. The circuit of FIG. 1 employs a synchronizing control arrangement in combination with lamp current sense as feedback. The IC 10 drives half bridge power stages including power MOSFET transistors 11 and 12 controlled by HO and LO output pins of the IC 10 via gate resistors 13 and 14. The IC 10 is provided with a bootstrap capacitor CB with a first terminal connected to the pin VB of IC 10 which may be coupled to a bootstrap diode in the IC 10 (not shown). The second terminal of bootstrap capacitor CB is connected to a common junction 15 of transistors 11 and 12 connected in series to high voltage DC bus (+Vbus). The IC 10 is provided with RC-timing circuit comprising of a timing resistor 17 connected between pins RT and CT and a timing capacitor 18 connected between pin CT and a circuit ground through anti-parallel diodes 19 and 20 with series resistors 21 and 22. A common junction of the anode of diode 19 and its corresponding series resistor 21 is connected to one terminal of a charge capacitor 23. The other terminal of the charge capacitor 23 is connected to a positive terminal of a voltage source +Vcc via resistor 24. In FIG. 1, the +Vcc voltage pin of IC 10 is used as the voltage source terminal to which the resistor 24 is coupled.

Power MOSFET transistors 11 and 12 are controlled by IC 10 to generate an AC voltage applied via DC decoupling capacitor 25 to a resonant tank which includes a resonant inductor 26 and a resonant capacitor 27, and to a discharge lamp 28 connected in parallel to resonant capacitor 27. A series capacitor 29 is used as a decoupling capacitor to minimize low frequency lamp pin leakage current (that may cause electrical shock when replacing the lamp).

The controller IC 10 has a built in oscillator, such as the industry standard CMOS 555 timer. An initial oscillator frequency can be programmed by the timing resistor 17 and the capacitor 18 coupled to pins CT and RT of the IC 10. In the circuit of FIG. 1, voltage on low side output LO pin of IC 10 is in phase with the RT pin voltage signal. Since the RT pin voltage potential changes between low (0) and high (+Vcc) regarding common "com", the CT pin voltage VCT has a ramp shape superposed on a DC voltage. The IC 10 oscillator switches at high (⅔Vcc) and low (⅓Vcc) predetermined CT pin voltage levels.

A bipolar switching transistor 30 having an anti-parallel input diode 31 is connected between charge capacitor 23 and circuit ground. The transistor 30 switches at zero crossings of its control signal (base current), and provides a forced synchronization of the oscillator in IC 10 with desirable operating AC frequency above resonant. A voltage feed back circuit VF includes a phase shift circuit 32 connected between the inverter high output (≈Vout) and the transistor 30 input via a coupling resistor 33. The phase shift circuit 32 includes capacitors 34 and 35 and a resistor 36 for attenuating and shifting forward the phase of the voltage feedback signal VF. This AC voltage feedback signal is then converted to a sinusoidal current signal Iin applied to the input of transistor 30.

In FIG. 1, a lamp positive current feedback circuit VPF is provided in addition to the voltage feedback circuit VF. It comprises a negative voltage charge pump 45 connected in parallel to the series capacitor 29 that is used as a lamp current sensor for the current feedback circuit VPF. The charge pump 45 is used for generating a DC feedback signal proportional to lamp current of lamp 28. The negative voltage charge pump 45 includes a capacitor 46 connected in series with diodes 47 and 48, a storage capacitor 49 and a loading resistor 50. The output signal of charge pump may be limited to avoid unstable operation. For example, in FIG. 1, a Zener diode 47 is used for limiting the current feed back bias signal current Ib. The output of negative voltage charge pump is actually a positive current feedback signal coupled into the input of transistor 30 via a resistor 51.

In FIG. 1, a Zener type diode 47 regulates the charge pump output voltage VPF of the charge pump by limiting its output. The Zener diode 47 provides a referenced negative bias current signal Ib to the input of transistor 30 when the lamp is in steady-state operation. The referenced current signal Ib at full ballast load contributes to stability of operation even if, for some reason, the lamp current increases above its nominal operating value or the output of the ballast is accidentally shorted. It is understood that other known circuits may be employed for generating limited negative bias current Ib signaling of current presence in a discharge lamp.

According to one embodiment of the invention, an optional frequency dimming capability is provided for ballast inverters by a variable DC control current Ic (see also, Osram Sylvania U.S. Pat. No. 7,030,570). In FIG. 1, an optional dimming network includes a resistor 52 and a DC control current Ic source 53.

When the lamp 28 is disconnected from the ballast, the bias current Ib is almost zero. Since leakage current in the lamp is negligibly low the open circuit voltage ≈Vout should match the given lamp starting voltage. For an instant start T8 lamp 28, the ballast starting voltage is usually specified at about 600-700 Vrms range. The required starting or no load voltage can be tuned by phase variations of the phase shifting circuit 30. Phase advance of the feedback signal is determined by the parameters of the components of a phase shift circuit 32. For instance, by reduction of resistor 35 value the phase of the feedback signal current Ib) can be advanced and lamp starting voltage can decreased, or vise versa. When gas in the lamp breaks down lamp and some current starts flowing via the capacitor 29, the bias current Ib in the current feedback circuit emerges causing the inverter switching frequency to shift lower, so power in the lamp is increased to its nominal value.

The DC bias signal Ib from the charge pump 45 provides information to the inverter control circuit with IC 10 whether or not the lamp 28 is connected to the ballast.

Figure 2:
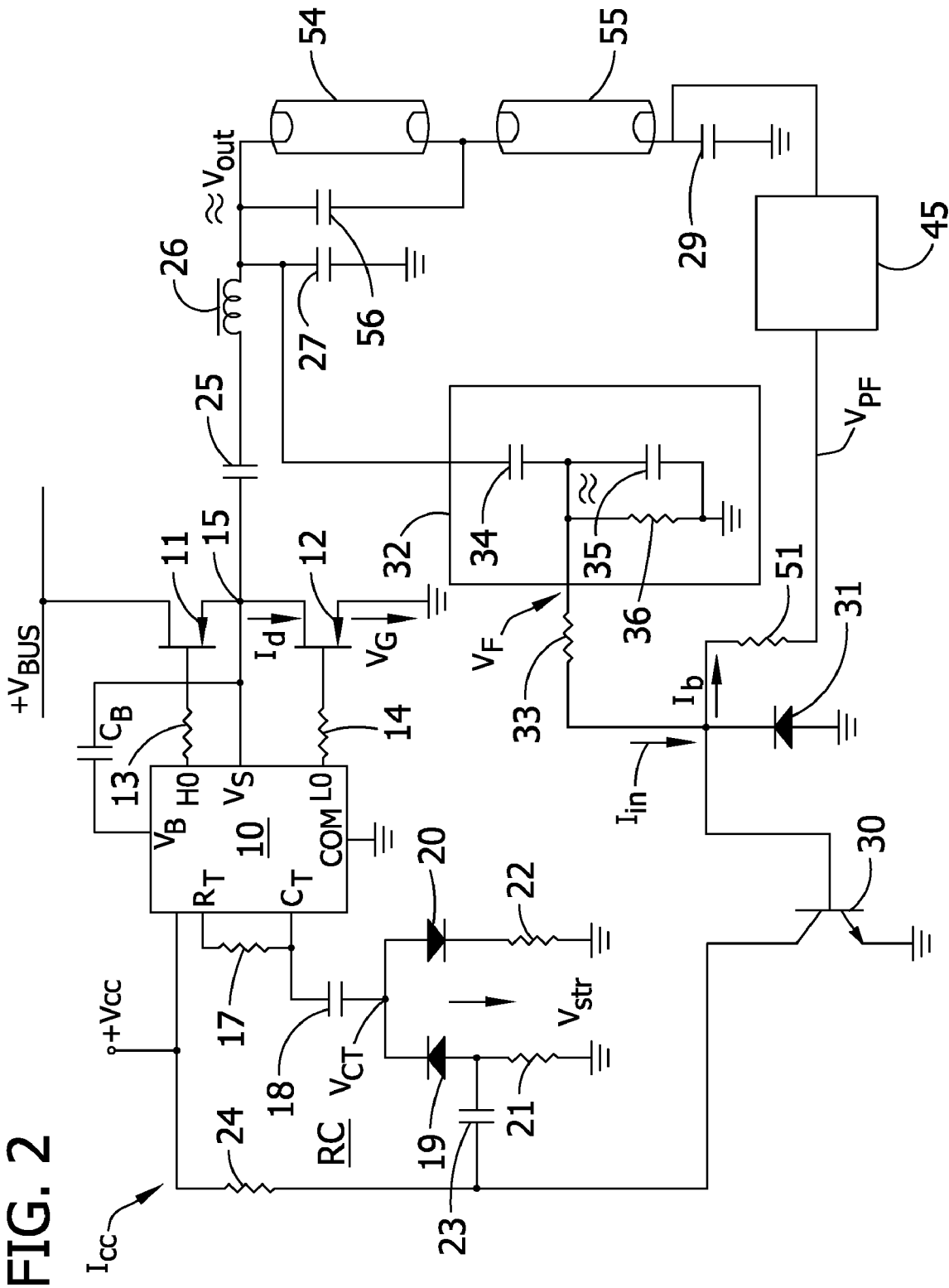
FIG. 2 is a version of the circuit diagram shown in FIG. 1 for powering two gas discharge lamps connected in series.

In FIG. 2, a circuit diagram of an embodiment of the invention for powering two gas discharge lamps 54 and 55 connected in series is presented. This series lamps connection requires higher output inverter nominal voltage Vout. Therefore, the series resonant inverter of FIG. 2 with series lamps connection operates with higher Q, with less frequency variations and higher efficiency.

To provide reliable instant starting of the lamps, a small capacitor 56 (100-300 pf) is connected in parallel to the lamp 54. When a high output voltage is generated by the inverter, it is first primarily applied to the lamp 55 and then, after lamp 55 starts, to the lamp 54. Series lamps 54 and 55 may be provided with preheating means instead capacitor 56 (not shown in FIG. 2). In FIG. 1 and FIG. 2, a 1.8-2.4 nf decoupling capacitor 29 is utilized as a current sensor to which the positive current feedback circuit 45 is coupled in parallel. The voltage across capacitor 29 is 2 to 4 times less than voltage across the lamp 54 or 55. In this series lamp circuit there is no need for additional ballasting. Therefore, in the circuit of FIG. 2, power loss in the resonant inductor 26 is lower.

Figure 2A:
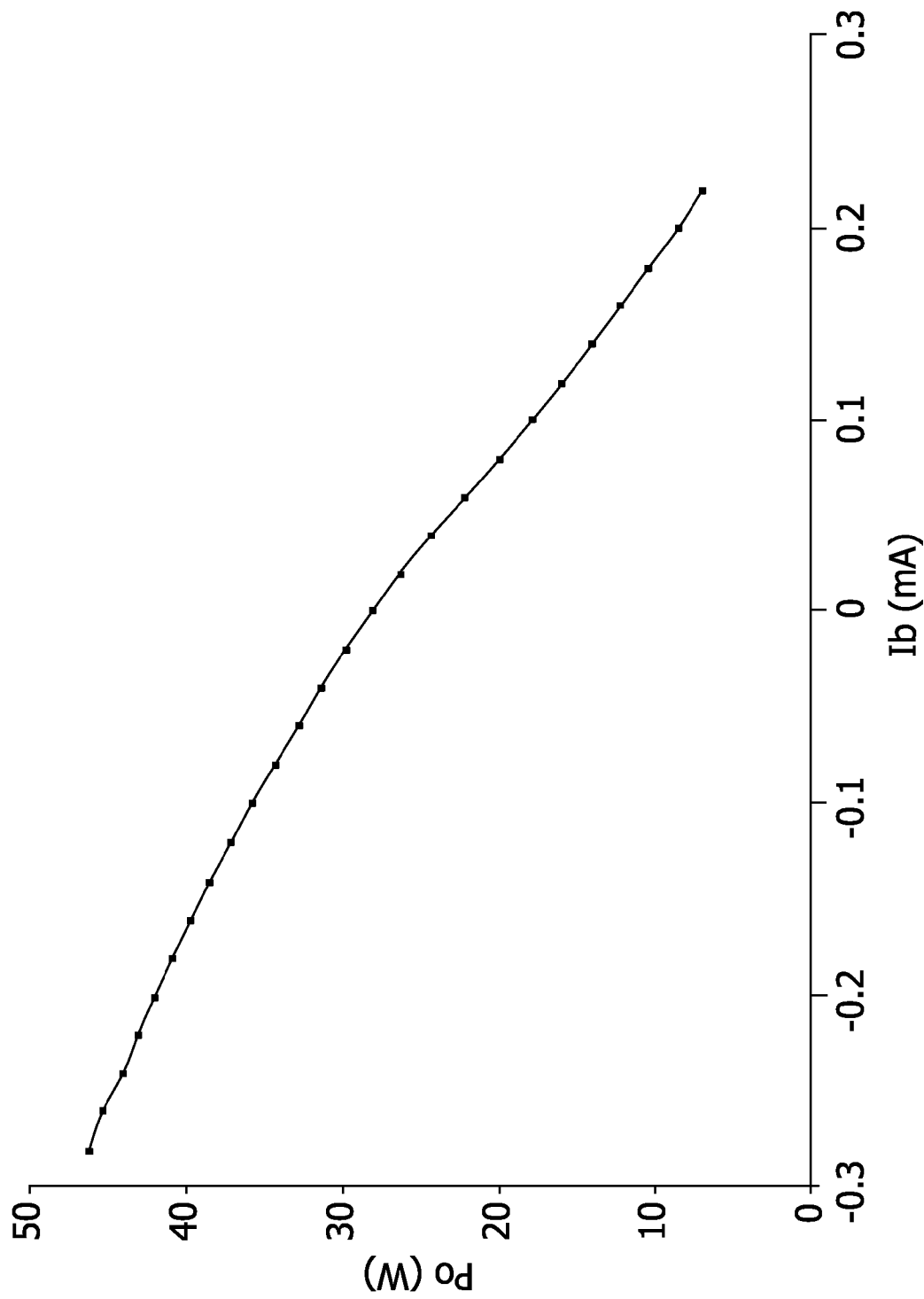
FIG. 2A shows output power Po of the series resonant inverter in FIG. 2 with two series T8 lamps versus bias current Ib.

Programmed inverter operation is achieved by controlling the DC bias current Ib which in turn controls the frequency of the inverter and its output power Po illustrated in FIG. 2A (which shows an experimental plot that is almost linear). Initial output power Po at Ib=O is set up by the phase shift circuit 32. This power is below nominal power. In general, nominal output power can be corrected by adding negative (or sometimes positive) increments of bias current generated from feedbacks. In FIGS. 1 and 2, negative bias current Ib from positive current feedback circuit 45 shifts the inverter frequency down as illustrated in time domain plots in FIG. 2B showing frequency shift during and after lamp(s) starting.

Figure 2B:
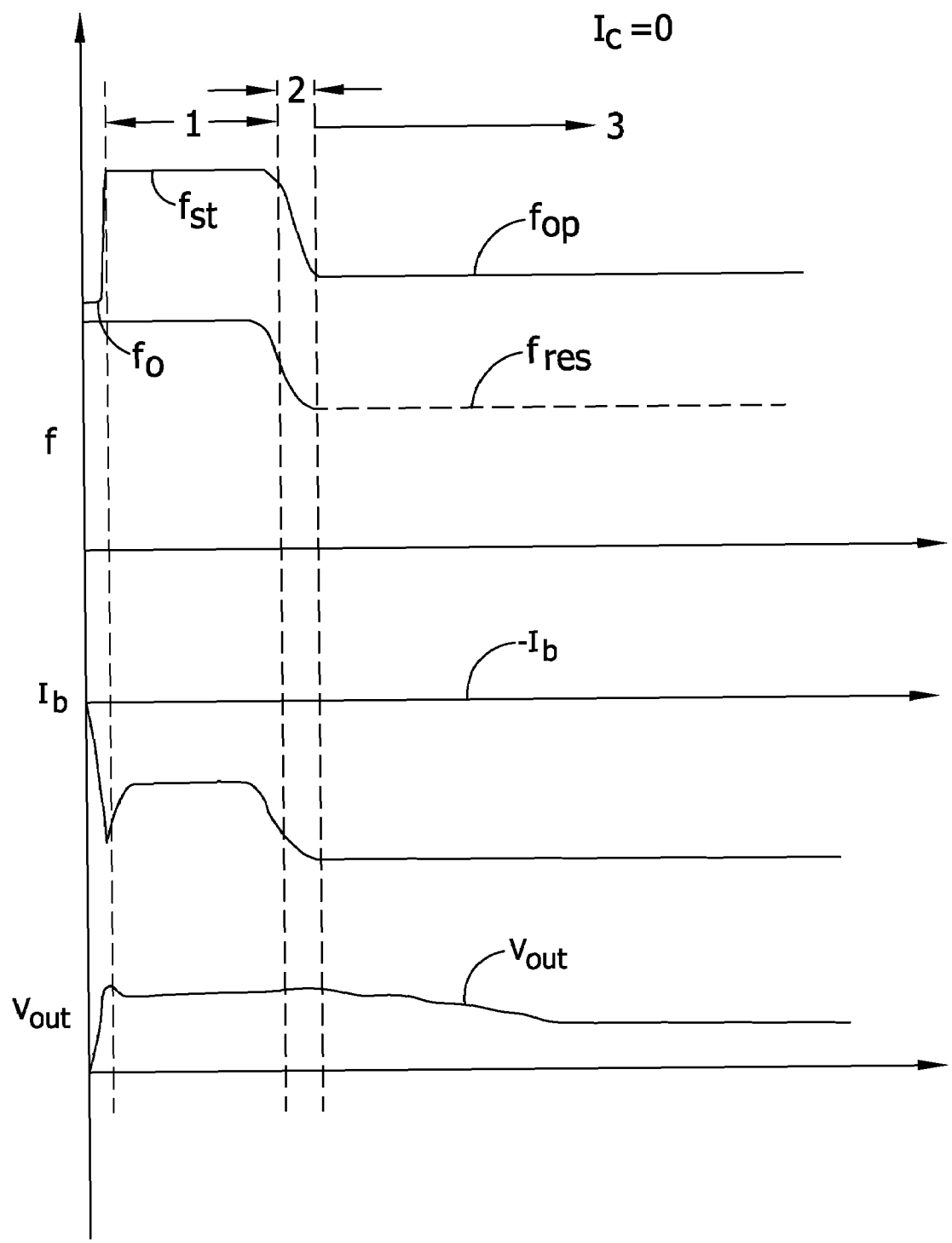
FIG. 2B shows transient time domain plots for frequencies and signals during lamp(s) starting with the inverters of FIG. 1 and FIG. 2.

First time interval 1 in FIG. 2B is the lamp pre-ignition interval. The IC 10 starts with its free running frequency $f_o$ (oscillator frequency without having synchronizing strobe pulses Vstr). The IC 10 oscillator is programmed such a way that its free running frequency $f_o$ is slightly above (e.g., 5-10%) an open circuit resonant frequency ($f_o > f_{res}$). Free running frequency $f_o$ is programmed by timing resistor 17 and timing capacitor 18 both coupled to the IC 10. Starting at this frequency $f_o$ initially with no load, the inverter generates rising output voltage ≈Vout. Voltage feedback signal via circuit 32 locks in and instantly changes the IC 10 frequency from free running frequency $f_o$ to higher value start frequency $f_{st}$, that determines desired open circuit voltage ≈Vout. The resonant load frequency plot $f_{res}$ varies depending on lamp resistance, as shown in FIG. 2B. When starting, glow current in the lamp 28 (FIG. 1) or glow current in the lamp 55 (FIG. 2) will cause some voltage drop across capacitor 29 from the very beginning of lamp start and, some negative bias current Ib will appear and even boost inverter output voltage ≈Vout (see first time interval 1 in FIG. 2B).

Second time interval 2 is a gas breaking down interval, during which gas conductivity in the lamps starts increasing and resonant frequency $f_{res}$ of the resonant load starts diminishing. The negative DC bias current Ib will increase (see second transient time interval 2 in FIG. 2B). The negative bias current signal Ib will cause a phase delay for strobe pulses generated by transistor 30. Therefore, the IC 10 frequency shifts down from starting frequency $f_{st}$ to lower operating frequency $f_{op}$ (see third interval 3 in FIG. 2B). Since the frequency shift follows lamp current inverter change, the inverter always operates above floating resonant frequency $f_{res}$.

At the beginning of the third interval 3, DC negative bias current Ib achieves a saturation caused by the Zener diode 47 used in the positive current feedback circuit 45 (see FIG. 1). Therefore, the bias current Ib determines the operating frequency and the output power $P_O$ of inverter (60) (see FIG. 2A). A resistor 51 is selected to provide nominal lamp power. Having a reference Ib bias current in the steady-state mode (interval 3) provides stability of this mode. At the input of transistor 30, the voltage feedback sinusoidal current signal Iin is compared with the reference DC signal Ib. If output voltage ≈Vout and accordingly, signal Iin will increase for some reason, the phase of the strobe pulse will have a tendency to advance and decrease ≈Vout providing a negative feedback action.

If the lamp(s) are not connected to the ballast, the ballast may operate in an open circuit mode generating ≈Vout about 600-650 Vrms. Power losses in the inverter will increase several watts, preferably in the resonant inductor 26 and MOS switching transistors 11 and 12, but will be well below acceptable limits. For instance, in a 3 lamps (T8) ballast, open circuit power losses in the ballast are about 8-10 W. Regular power losses in the ballast with 120V AC line input and 90% efficiency are also about 8-10 W.

Figure 3:
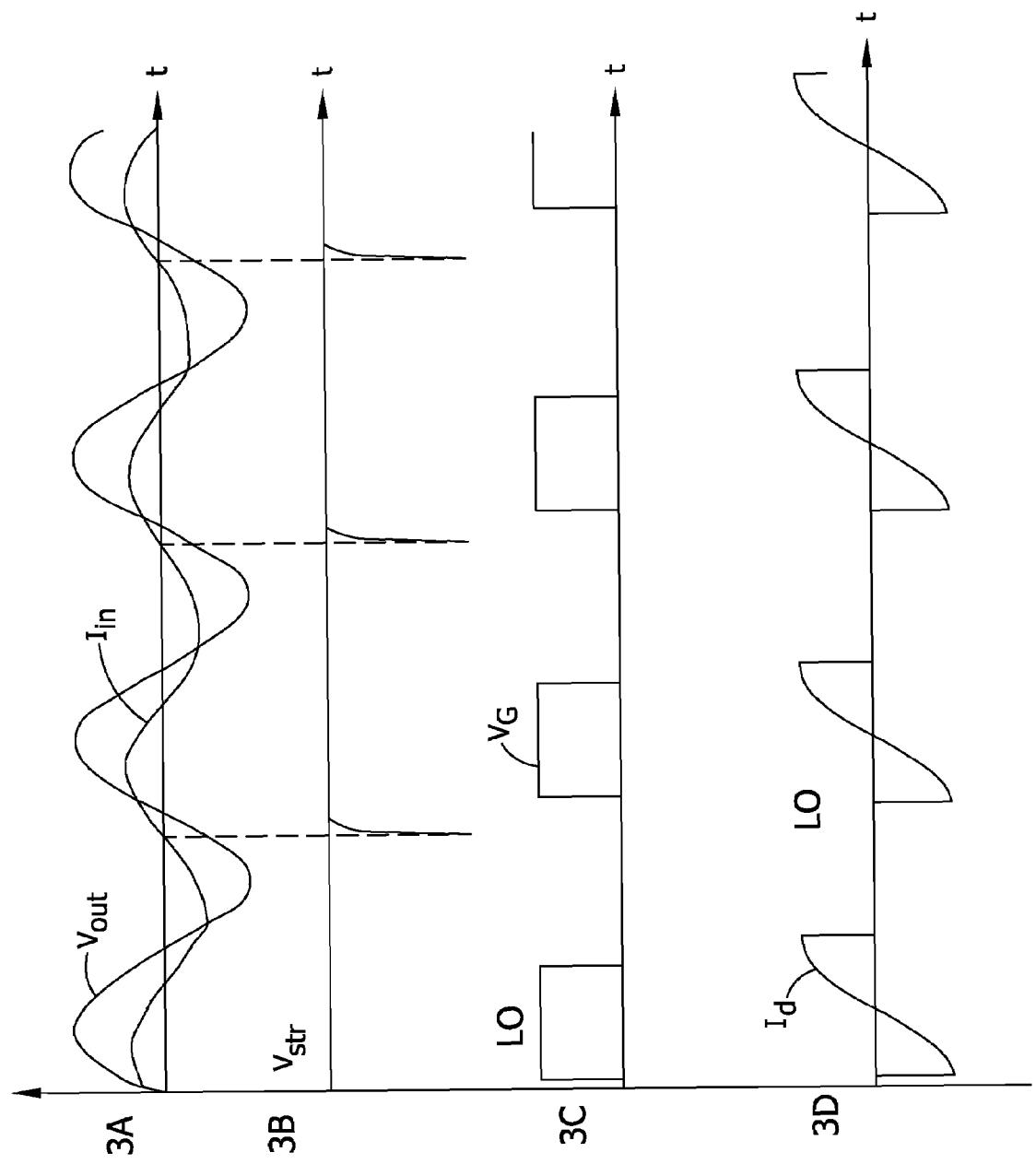
FIG. 3 shows waveforms of voltages, currents and control signals in the proposed inverters of FIG. 1 and FIG. 2 in an open circuit mode.
Figure 5:
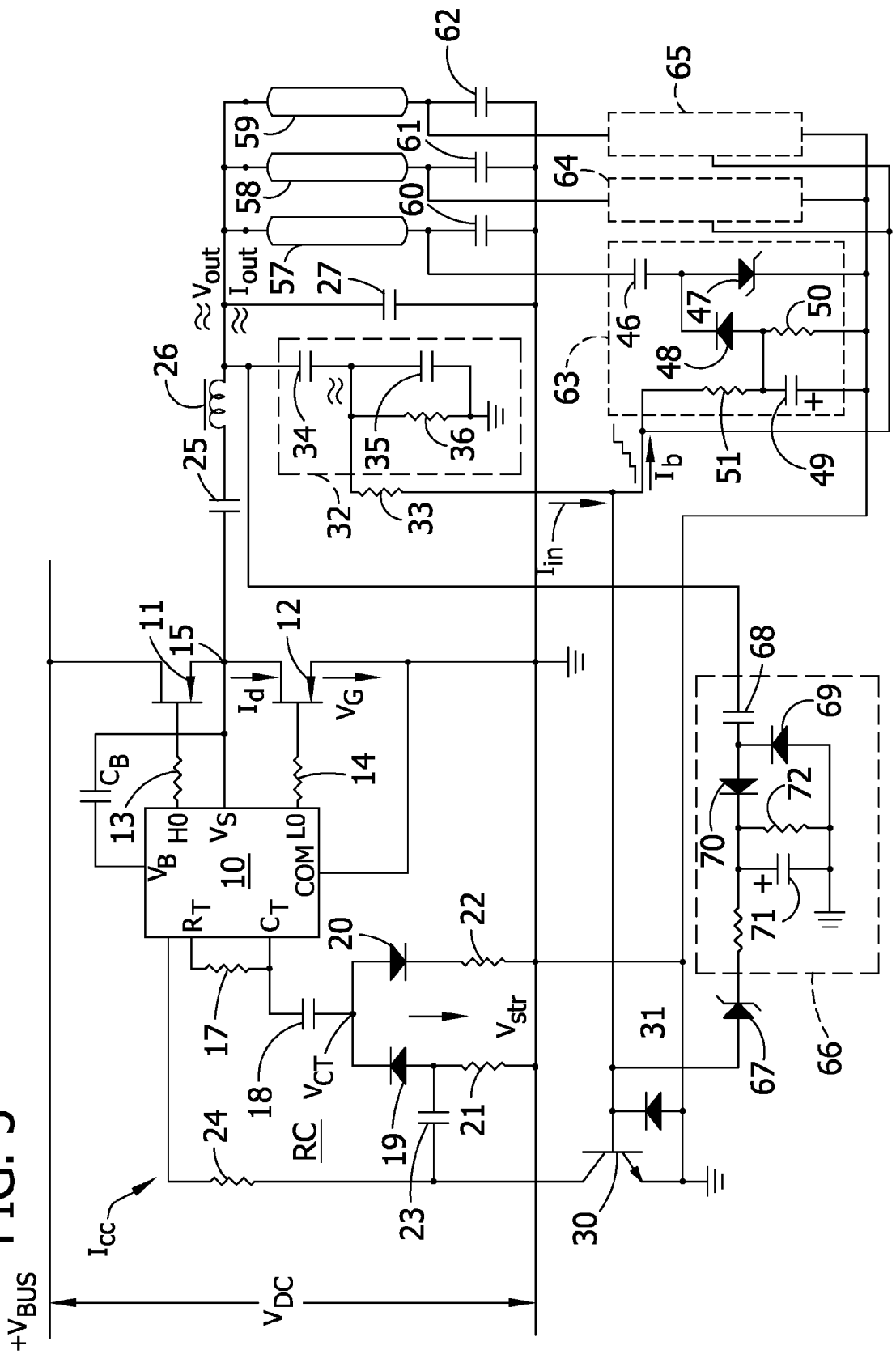
FIG. 5 is a circuit diagram of series resonant inverter according to one embodiment of the present invention, for powering several discharge lamps connected in parallel.

FIG. 3 illustrates open circuit mode operation, showing output voltage ≈Vout, phase advanced voltage feedback signal Iin, strobe pulses Vstr at zero crossing, gate voltage $V_G$ at lower MOS transistor 12, and its drain current $I_D$ versus time (see also FIG. 1 and FIG. 2 which illustrate these signals). The strobe pulses synchronize oscillations of IC 10 to a higher switching frequency, that is, up to 25-35% above nominal inverter frequency at full load (FIG. 5). A positive portion of drain current $I_D$ is slightly greater than the negative portion and this difference is due to some power loss in the inverter. The negative portion of $I_D$ does not cause noticeable losses in the internal diodes of transistors 11 and 12 (not shown in FIG. 3) since positive gate voltage $V_G$ is basically applied during negative current intervals as well shorting the internal diodes by "on" resistance of the MOS transistors 11 and 12.

The inverter mode during the starting interval 1 (FIG. 2B) is almost identical to the open circuit mode.

Figure 4:
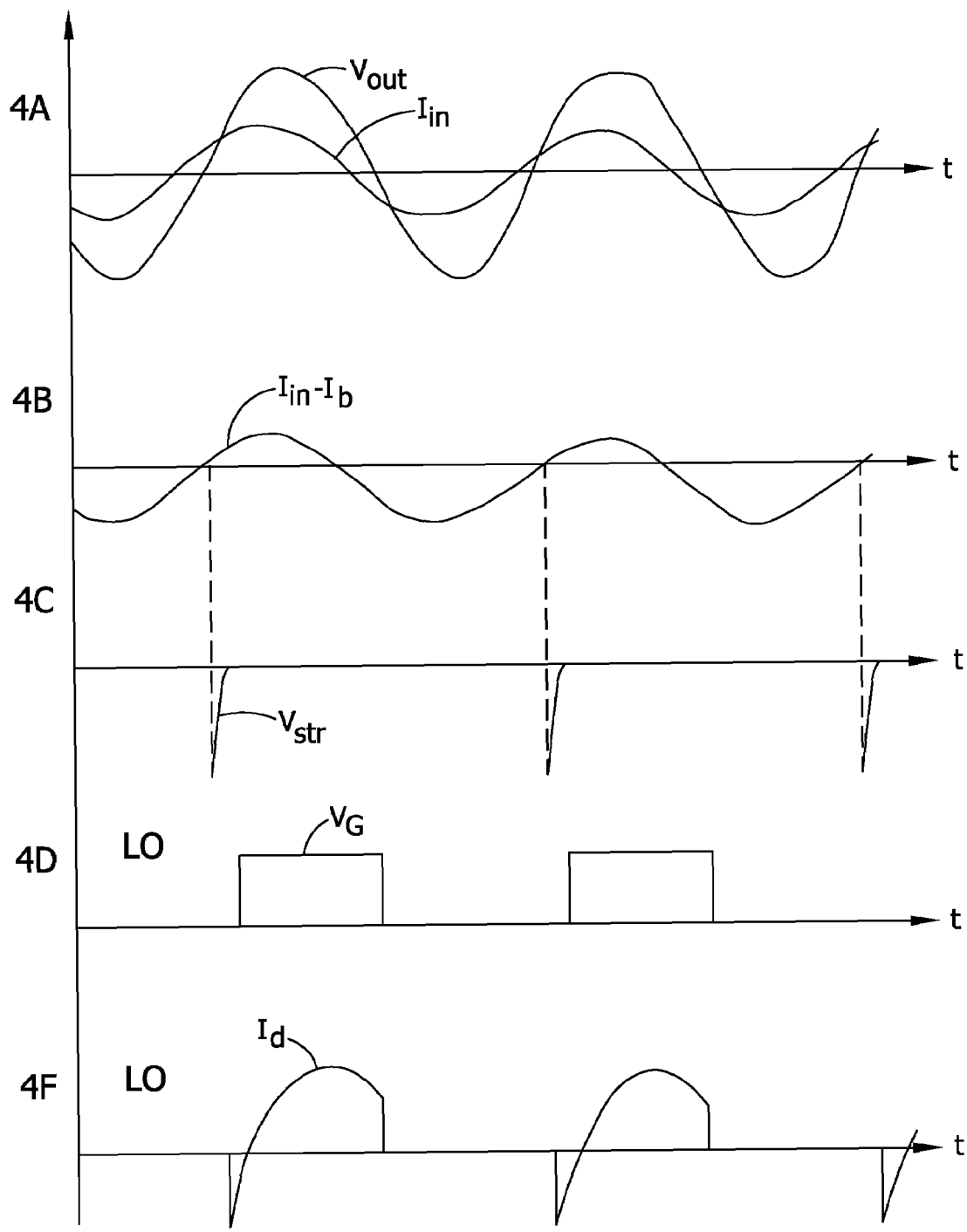
FIG. 4 shows the waveforms in inverters FIG. 1 and FIG. 2 in steady-state mode under full load.

FIG. 4 illustrates steady-state mode after lamps starting, when the frequency is shifted down and the inverters in FIG. 1 and FIG. 2 are loaded by ignited lamps (time interval 3 in FIG. 2B). It can be seen in FIG. 4 that by adding a negative bias DC signal Ib (i.e., a positive current feedback signal) to sinusoidal voltage feedback signal Iin (4b), strobe pulses Vstr (4c) are shifted back relative to strobe pulse waveforms 3B in FIG. 3.

Therefore, transistors 11 and 12 are turned off with a longer delay (waveform 4F of FIG. 4 compared to the open circuit mode waveform 3D of FIG. 3). The more phase delay of gate signals regarding output voltage ≈Vout, the less switching frequency and the higher power delivered to resonant inverter load.

In one embodiment of the invention shown in FIG. 5, each gas discharge lamp is connected in series with a buffer capacitor and all these series networks are connected in parallel to each other and in parallel to a resonant capacitor of a resonant tank. The output high frequency voltage ≈Vout generated by resonant tank provides output current ≈Iout to power all lamps connected in parallel. FIG. 5 illustrates a version with 3 gas discharge lamps, but the number of lamps used in parallel could be different, usually from 1 to 4 lamps.

FIG. 5 demonstrates a first gas discharge lamp 57, a second discharge lamp 58 and a third discharge lamp 59 each connected in series with grounded buffer capacitors 60, 61 and 62, respectively. The series capacitors provide an additional ballasting effect for the lamps and they are also used in the invention as lamp current sensors for the current feedback and as decoupling capacitors for limiting low frequency lamp pin leakage current to ground. Positive current feedback circuits 63, 64 and 65 (schematic of these positive current feedback circuits is identical to the schematic of positive current feedback circuit 45 in FIG. 1) are connected in parallel to the buffer capacitors 60, 61, and 62, respectively. Each of positive current feedback circuits 63, 64 and 65 provides a reference negative DC bias current when a corresponding lamp operates. All DC bias currents Ib from all lamps are summed up at the input of transistor 30. Summed feedback DC bias signals Ib are mixed with voltage feedback AC current signal Iin at the transistor 30 input to provide programmed inverter operation by phase shift. The more discharge lamps are connected in parallel, the more resolution is required from the frequency synchronization circuit to utilize a wider range of power variations according to FIG. 2A.

FIG. 5 also illustrates regulating and limiting output voltage ≈Vout of the series resonant inverter through a static voltage negative feedback circuit. This feedback circuit uses positive increments of bias current Ib in FIG. 2A to increase switching frequency (see FIG. 2A). It includes a charge pump 66 connected in parallel to the output of the resonant inverter, and a zener diode 67 as a source of reference voltage. The charge pump 66 includes a capacitor 68 connected to high output ≈Vout, diodes 69 and 70, a storage capacitor 71, and a loading resistor 72. The positive output voltage of pump 66 is compared with a voltage of zener diode 67. When the voltage of charge pump 66 exceeds the threshold voltage of zener diode 67, a positive feedback current is generated at the base of transistor 30. It forces the controller IC 10 to increase inverter switching frequency and to reduce output voltage ≈Vout (see FIG. 2A). By setting the output voltage of the charge pump 66, a regulated level of voltage can be set up to desirable maximum open circuit voltage. One of goals of having a regulated output voltage is to protect ballast components from over voltage and from excessive power loss in the ballast when operating as an open circuit. For T8 lamp ballasts, open circuit voltage ≈Vout can be selected in 65 O-700V rms range that allows reliable lamp starting.

In all above transformerless inverter circuits (FIGS. 1, 2 and 5) according to the present invention, there is no DC conductivity between any lamp pin and DC voltage source Vdc.

In FIG. 5, capacitors 25, 60, 61, 46 have a low capacitance value to separate the DC and the 120 Hz ripple voltages from the lamp pins. Said voltages are generated by the AC rectifier (not shown in above circuits). Therefore, safety requirement concerning lamp pin to ground leakage current can be met.

The following illustrates an operating flow sequence according to one embodiment of the invention for an inverter with all 3 T8 lamps connected (instant start). This operation provides a reliable start. The resonant inverter operates safely in an inductive mode, above the floating resonant frequency. The circuit in FIG. 5 may be programmed to operate according to the following steps 1 to 6:

Step 1: IC oscillator 10 starts and operates at its free running frequency $f_o$ selected above inverter open circuit resonant frequency ($f_o > f_{res}$).

Step 2: The switching frequency $f_o$ is shifted to a higher starting frequency $f_{st}$ by the voltage feedback circuit with the phase shifter 32 ($f_{st} > f_o$).

Step 3: Output voltage ≈Vout is limited. When Vout≧≈Vout.max, the switching frequency is shifted higher by the negative voltage feed back circuit (the charge pump 66 and the Zener diode 67) generating a positive component of DC bias current Ib.

Step 4. A negative DC bias current component of Ib is generated from the first lamp current. Next, a negative DC bias current component of Ib is generated from second lamp current. Finally, a negative DC bias current component of Ib is generated from third lamp current.

Step 5. The negative feedback DC bias currents from all lamps are summed. The total DC bias current Ib becomes negative. The total DC bias current Ib is mixed with the AC current signal Iin from voltage feedback from phase shift circuit 32.

Step 6. The switching frequency is shifted down from starting frequency $f_{st}$ to lower operating frequency $f_{op}$, until saturating total DC bias current Ib ($f_{op} < f_{st}$). Saturated Ib current corresponds to the inverter mode at full lamps power.

Figure 6A:
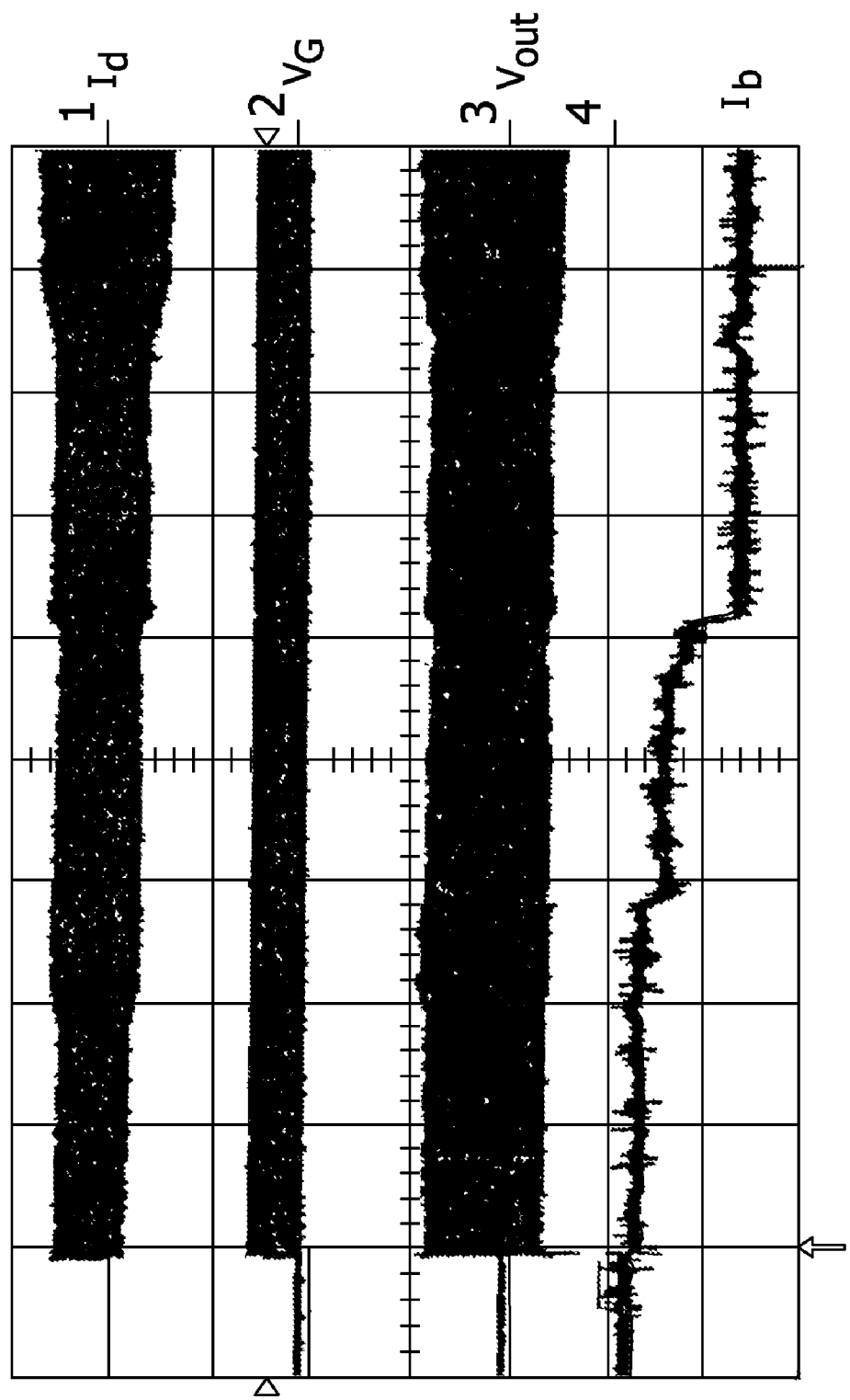
FIG. 6A shows transient oscillograms of the signals of the inverter of FIG. 5 during programmed starting.

In FIG. 6A, basic signal oscillograms for the circuit in FIG. 5 are shown, taken at starting accordingly to the flow sequence noted above. Because lamps characteristics differ, starting lamps may have some time shift in starting (note bias current Ib in FIG. 7 at start).

Figure 6B:
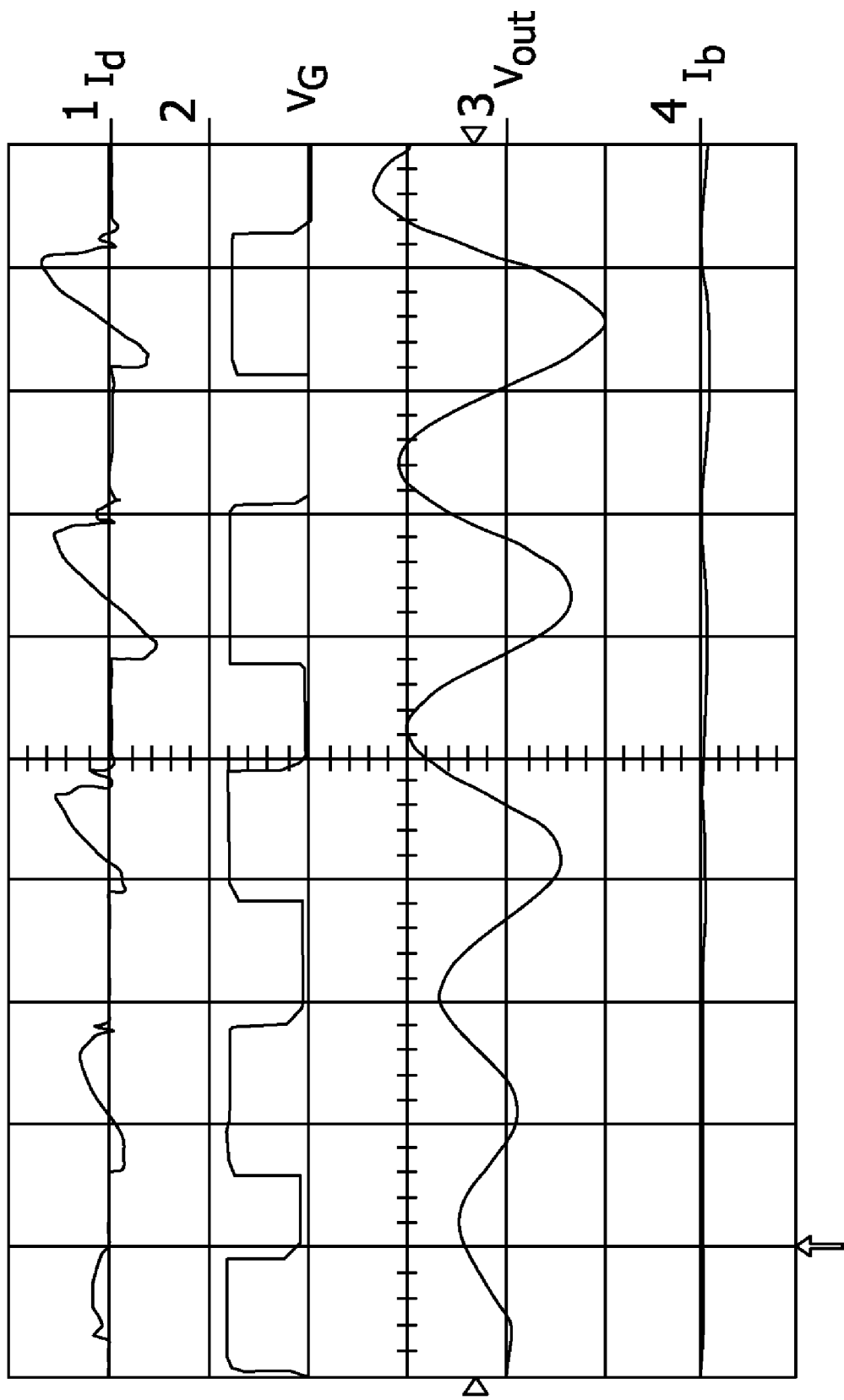
FIG. 6B shows detailed oscillograms of the signals in the inverter in the very beginning of starting.
Figure 7A:
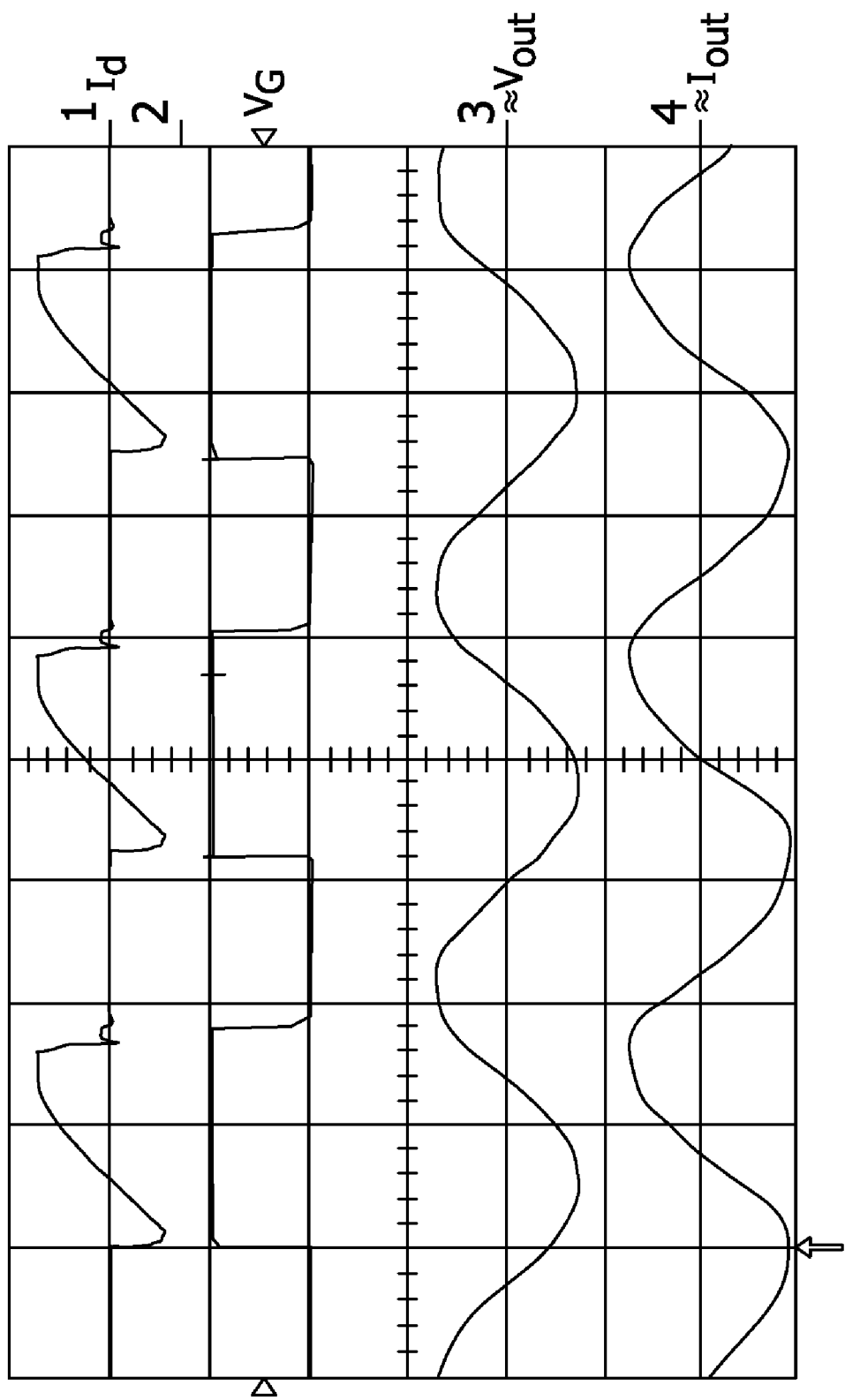
FIG. 7A shows steady-state mode oscillograms of signals of the inverter of FIG. 5 operating to 3 lamps (step 1).
Figure 7B:
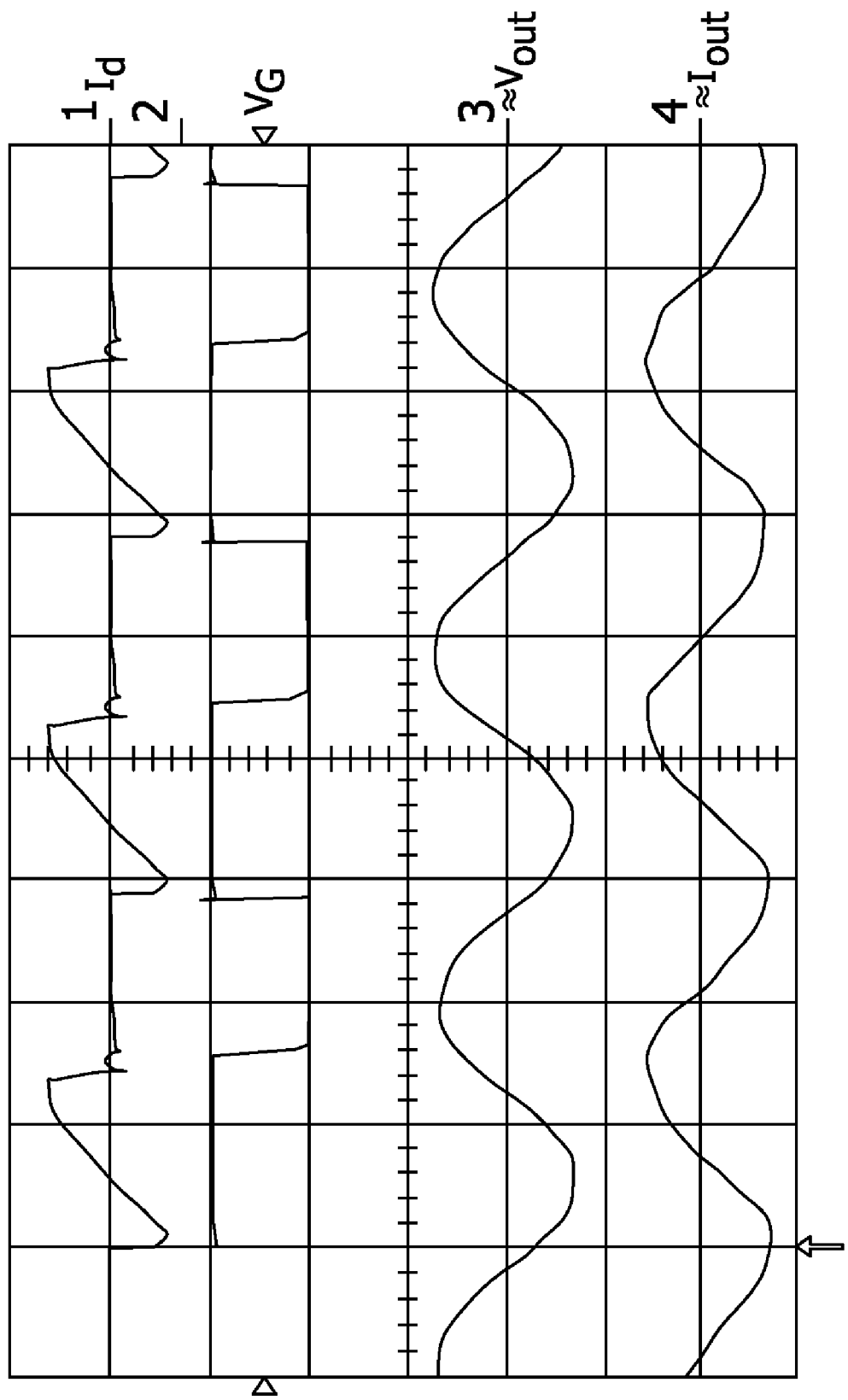
FIG. 7B shows steady-state mode oscillograms of signals of the inverter of FIG. 5 operating to 2 lamps (step 2).
Figure 7C:
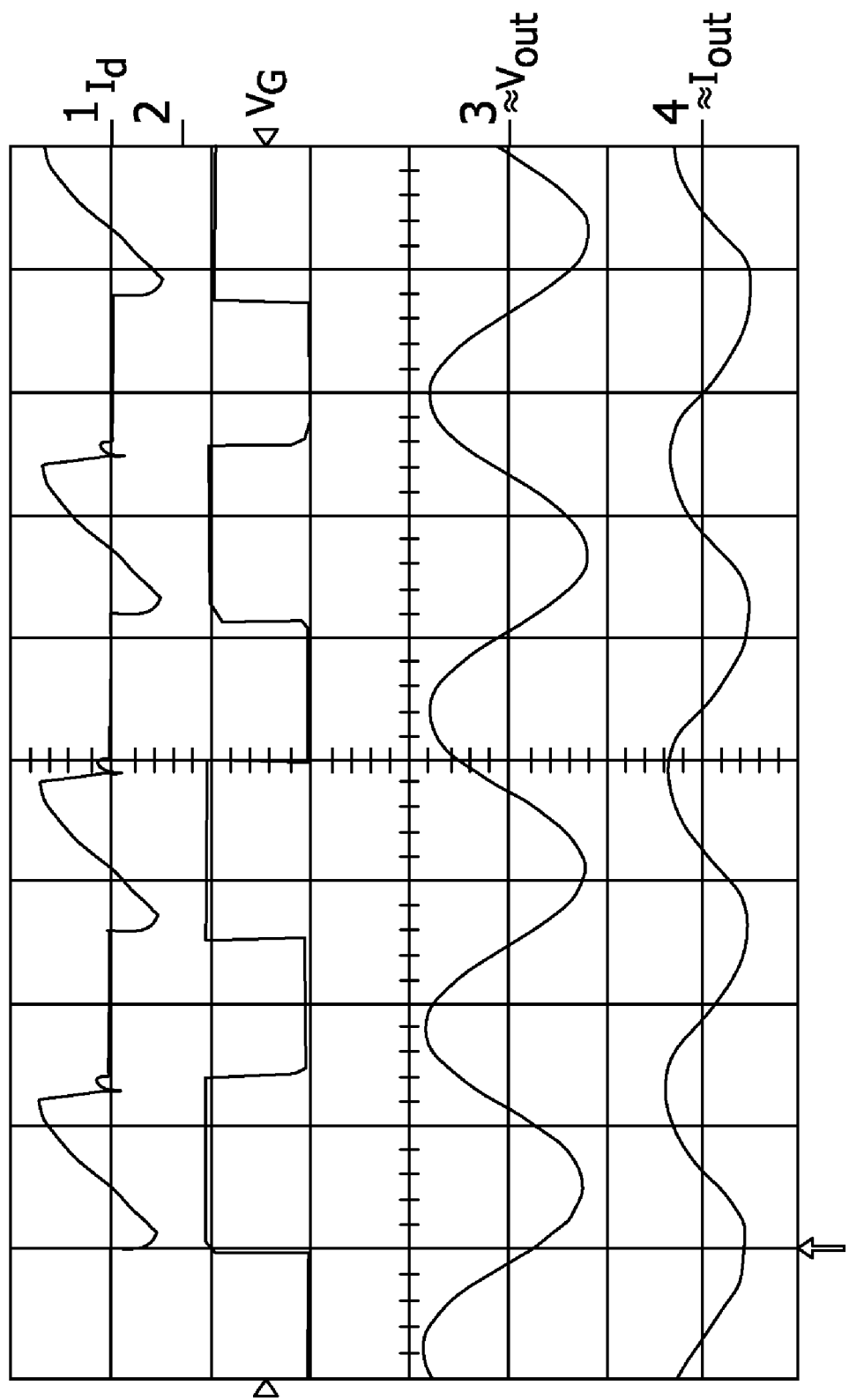
FIG. 7C shows steady-state mode oscillograms of signals in the inverter of FIGS operating to single lamp (step 3).
Figure 7D:
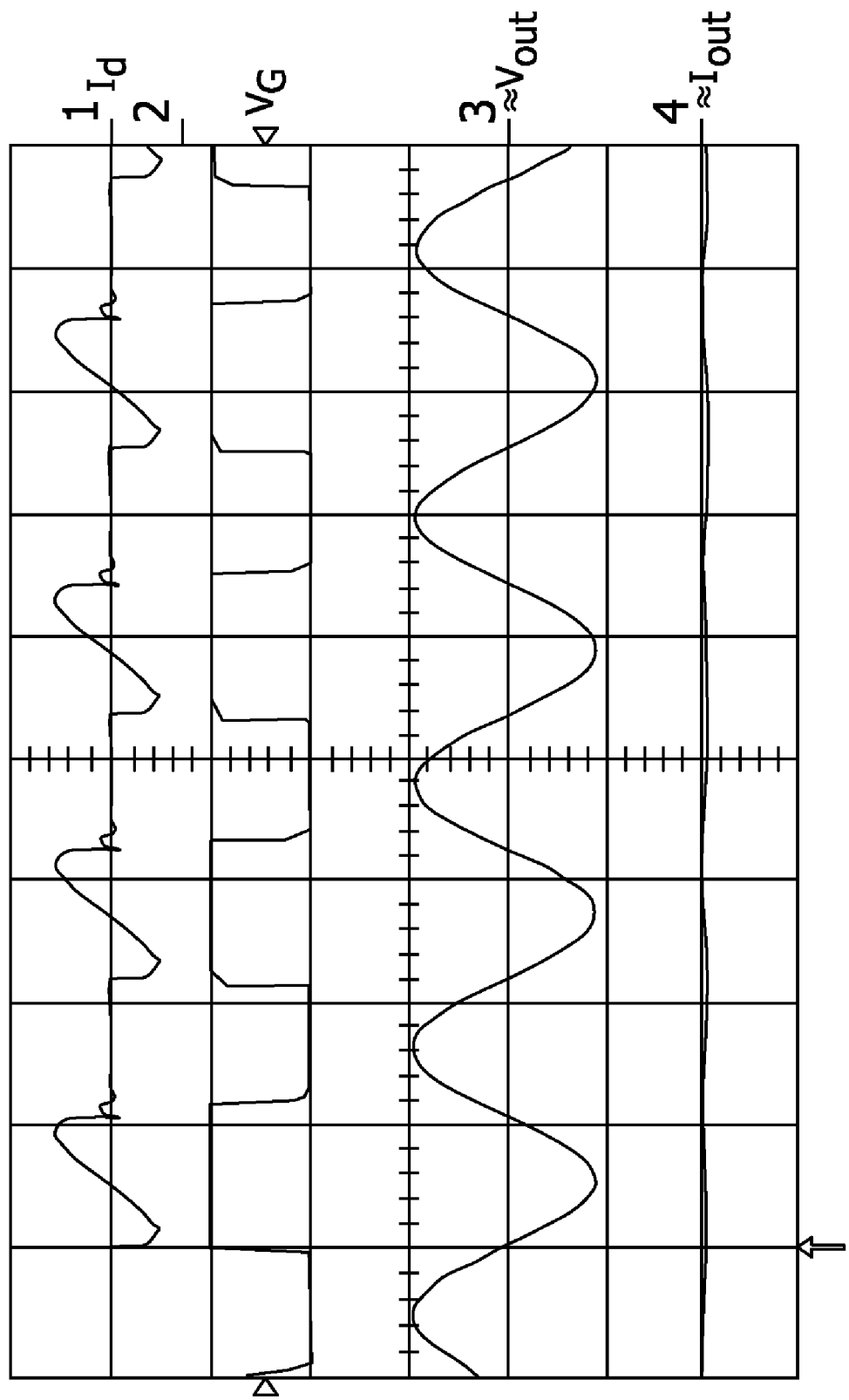
FIG. 7D shows steady-state mode oscillograms of signals in the inverter of FIGS operating to open circuit (step 4).

FIG. 6B displays detailed oscillograms at the very beginning of the starting process shown in FIG. 6A. The inverter is started at full DC Bus voltage 430V in an inductive mode. For example, the inverter is built with ST Micro self-oscillating driver L6571A (the IC 10) and STD6NK50 power MOSFETs (transistors 11 and 12). The following steps 1-7 below illustrates by detailed oscillograms an operation sequence of (the invention in) the inverter in FIG. 5 during replacing of all 3 lamps:

Step 1. All 3 lamps operate in steady-state mode at nominal power (see FIG. 7A).

Step 2. One lamp has been disconnected. The bias current Ib is decreased by ⅓ of its nominal value, the switching frequency is increased, and the inverter output power is roughly decreased by about ⅓ of its nominal value (see FIG. 7B).

Step 3. Two lamps have been disconnected. Bias current Ib is further decreased by another ⅓ of its nominal value, switching frequency is further increased, and inverter output power is decreased by roughly about another ⅓ of its nominal power (see FIG. 7C).

Step 4. All three lamps have been disconnected. Negative DC bias current Ib is zero (Ib=0). Output voltage ≈Vout achieved its maximum value ≈Vout.max limited with the help of voltage negative feedback circuit (see FIG. 7D; see block 66 in FIG. 5).

Step 5. One lamp has been connected. Bias current Ib is increased by ⅓ of its nominal value, switching frequency is decreased, and inverter output power is increased by roughly about ⅓ of its nominal power (see FIG. 7C).

Step 6. Two lamps have been connected. The bias current Ib is increased by ⅓ of its nominal value, the switching frequency is decreased, and the inverter output power is roughly increased by about ⅓ of its nominal value (see FIG. 7B).

Step 7. All 3 lamps operate in steady-state mode at nominal power (see FIG. 7A).

The inverter in FIG. 5 features 4 steps of programmed operation corresponding to each lamp connected to the ballast. When all 3 lamps are connected, the current feedback circuit provides 3 referenced feedback negative signals forming full DC bias nominal current Ib.nom (Step 1). When 2 lamps are connected, Ib.nom is reduced by 1/3 (Step 2), and when just 1 lamp is connected, Ib.nom is reduced by 2/3 (Step 3). When no lamps are connected to the ballast (open circuit), bias current Ib is almost zero (Step 4).

The inverter mode is programmed through the lamp current feedback circuit by selecting feedback signal Ib for each step of operation.

FIGS. 7A, 7B, 7C and 7D illustrate signals in the inverter of FIG. 5 in different steps when consistently removing all old lamps and installing new lamps without resetting power. In all steps, the resonant load frequency floats but the inverter switching frequency follows up this changes being always above floating resonant frequency and does not overpower the lamps.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A programmed ballast comprising:
    a voltage fed resonant inverter connecting to a DC power supply and providing a current/voltage to at least one gas discharge lamp;
    a timing circuit for selectively switching the inverter at a switching frequency;
    a zero crossing circuit for controlling the switching frequency of the timing circuit;
    a voltage feedback circuit responsive to the inverter output voltage, said voltage feedback circuit providing a voltage feedback signal to the zero crossing circuit for modifying the switching frequency as a function of the current/voltage applied to the lamp;
    a positive current feedback circuit responsive to a current through the lamp and providing a positive current feedback DC signal to the zero crossing circuit for modifying the switching frequency as a function of the current through the lamp.

2. The ballast of claim 1 wherein the inverter provides current/voltage to a plurality of gas discharge lamps connected in series.

3. The ballast of claim 1 wherein the inverter provides high frequency AC current to a plurality of lamps connected to the inverter in parallel via buffer capacitors.

4. The ballast of claim 3 wherein the positive current feedback DC signal is proportional to the number of the plurality of parallel connected lamps.

5. The ballast of claim 1 further comprising a dimming circuit providing a dimming signal the zero crossing circuit.

6. The ballast of claim 1 wherein the positive current feedback circuit is a negative charge pump.

7. The ballast of claim 5 wherein the negative charge pump has an output voltage corresponding to the positive current feedback signal and wherein the negative charge pump includes a zener diode for regulating the charge pump output voltage.

8. The ballast of claim 1 wherein when gas in the lamp breaks down lamp and current through the lamp starts increasing, the positive current feedback DC signal causes the switching frequency to shift lower.

9. The ballast of claim 1 wherein the positive current feedback signal reduces the switching inverter frequency during inverter starting with lamps are in.

10. A method of energizing a gas discharge lamp from voltage fed frequency controlled resonant inverter comprising operation steps of:
    providing high frequency voltage above inverter open circuit resonant frequency;
    providing an AC voltage feedback signal for modifying the switching frequency of the inverter as function of variable inverter resonant frequency;
    providing a voltage feed back DC signal for limiting high frequency voltage above given value;
    providing a limited positive current feedback signal for modifying the switching frequency as a function of the current through the lamp.

11. The method of claim 10 wherein the voltage feed back signals are provided from a plurality of gas discharge lamps connected in series and wherein the positive current feedback signal is proportional to the current of all lamps.

12. The method of claim 10 wherein, when gas in the lamp breaks down and lamp current lamp starts increasing, the positive current feedback signal causes the switching frequency to shift lower.

13. The method of claim 10 wherein the positive current feedback signal reduces the frequency when sensing lamp glow current during lamp starting.

14. A programmed ballast comprising:
    an inverter connecting to a DC power supply and providing current/voltage to a plurality of gas discharge lamps connected in parallel;
    a timing circuit for selectively switching the inverter at a switching frequency;
    a zero crossing circuit for controlling the switching frequency of the timing circuit;
    a voltage feedback circuit responsive to the inverter output voltage, said voltage feedback circuit providing a voltage feedback signal to the zero crossing circuit for modifying the switching frequency as a function of the current/voltage applied to the lamps;
    a positive current feedback circuit responsive to a current through the lamps and providing a positive current feedback DC signal to the zero crossing circuit for modifying the switching frequency as a function of the current through the lamps.

15. The ballast of claim 14 further comprising a negative voltage feedback circuit responsive to the current/voltage provided to the lamps, said voltage feedback circuit providing a positive DC feedback signal to the zero crossing circuit for modifying the switching frequency when inverter output voltage exceeds a given predetermined value.

16. The ballast of claim 14 wherein the negative voltage feedback circuit comprises a charge pump connected in parallel to the output of the inverter, and a zener diode as a source of reference voltage wherein a positive output voltage of charge pump is compared with a voltage of the zener diode and wherein when the voltage of charge pump exceeds a threshold voltage of zener diode, a positive feedback current is generated to force the zero crossing detector to increase the frequency of the timing circuit and to reduce the inverter output voltage.

17. The ballast of claim 14 wherein the total positive current feedback signal is proportional to the number of the plurality of lamps.

18. The ballast of claim 14 wherein the positive current feedback circuits are negative output voltage charge pumps.

19. The ballast of claim 18 wherein the negative charge pump has an output voltage corresponding to the positive current feedback signal and wherein the negative charge pump includes a zener diode for limiting the charge pump output voltage/current.

20. The ballast of claim 14 wherein when gas in the lamp breaks down lamp and current through the lamp starts increasing, the positive current feedback signal causes the switching frequency of the zero crossing circuit to shift lower.

21. The ballast of claim 14 wherein the positive current feedback signal reduces the frequency of the zero crossing circuit during lamp start.

\* \* \* \* \*